Patented Sept. 7, 1948

2,449,038

UNITED STATES PATENT OFFICE 2,449,038

PREPARATION OF 3-SUBSTITUTED BENZO-TETRONIC ACID AND SALTS THEREOF

Martin E. Hultquist, Bound Brook, N. J., assignor to American Cyanamid Company, New York, N. Y., a corporation of Maine No Drawing. Application October 23, 1944, Serial No. 560,040

12 Claims. (Cl. 260—344.6)

1

This invention relates to a new method of preparing 3-substituted benzotetronic acid and salts thereof.

The 3-substituted benzotetronic acids have recently become of importance as intermediates in the preparation of 3,3' methylene-bis-(4-hydroxycoumarin) a compound having blood anti-coagulant properties. The 3 - substituted benzotetronic acids are also useful as intermediates in the synthesis of other organic compounds. The enol forms of these acids are also known as 3-substituted-4-hydroxycoumarins. Unfortunately, previously known methods of preparing 3-substituted benzotetronic acid require the use of expensive intermediates and difficult reaction conditions, including the maintenance of anhydrous conditions during the reaction.

One of the principal objects of the present invention is to prepare 3-substituted benzotetronic acid and its salts from cheap and readily available intermediates by an extremely simple and efficient process which requires no unusual or difficult reaction conditions, equipment, or isolation procedures. Another principal object of the invention is to provide a process of preparing 3-substituted benzotetronic acids in an aqueous reaction media. Other objects are to provide a process that can be brought to completion in a short time, use a minimum of reagents, and give high yields of product. Other objects of the invention will appear hereinafter.

I have discovered that 3-substituted benzotetronic acids and their salts may be prepared by reacting in aqueous media containing an alkali-metal or alkaline earth metal hydroxide or alkali metal carbonate an acetyl-salicylyl halide with a compound having a doubly activated methylene group when at least one of the activating groups is an

radical and the other is the same or any other polar activating group of the class consisting of the radicals

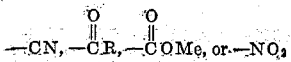

In these radicals R is any alkyl radical of from 1 to 20 carbon atoms and Me is a salt-forming radical.

The reaction whereby 3-substituted benzotetronic acids and their salts are prepared by the process of the present invention may be illustrated by means of the following equations in which acetylsalicylyl chloride is caused to react with a

2 compound having a doubly activated methylene group in the presence of sodium hydroxide. It will be understood, of course, that other acetyl salicylyl halides, such as acetyl salicylyl bromide, or other alkalis may be used. The reaction is believed to take place in several stages, the first being represented by the following equations:

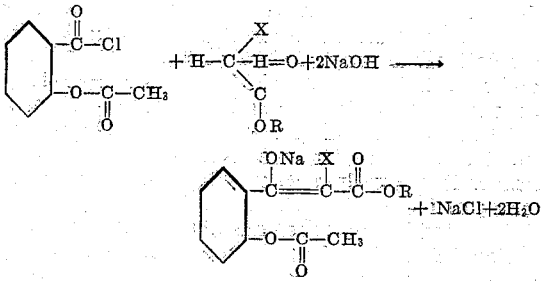

Upon further addition of more alkali, sodium acetate and an alcohol are split off and the residue cyclizes to yield a salt of 3-substituted benzotetronic acid, as illustrated by the following equation:

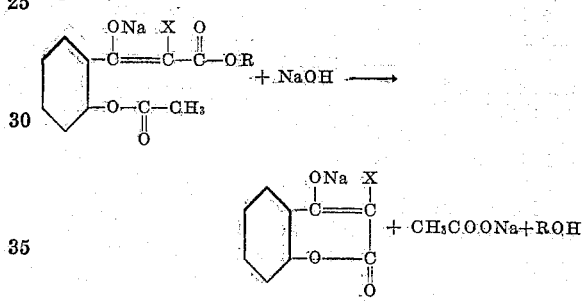

Treatment of the salt with an acid results in the formation of 3-substituted benzotetronic acid:

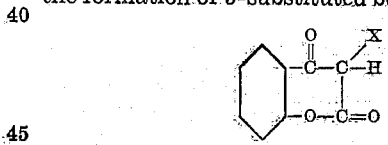

This latter compound probably exists in whole or in part in the tautomeric form:

In these formulae X represents the second polar activating group mentioned above. When, for example, ethyl acetoacetate is used as starting material, X is

and the product is 3-acetylbenzotetronic acid or, as it may also be called, 3-acetyl-4-hydroxy-coumarin.

In addition to ethyl acetoacetate, I may use other compounds having a methylene group doubly activated by polar groups, as, for example, methylacetoacetate, butylacetoacetate, the diesters of malonic acid, such as: diethyl malonate, dibutyl malonate, di-isoamyl malonate, di(2 ethylhexyl) malonate, didodecyl malonate, dioctadecyl malonate and the esters of cyanoacetic acid, such as ethyl cyanoacetate, butyl cyanoacetate, benzoyl acetic ester and the like.

Although sodium hydroxide is preferred as the alkali, it will be understood that other alkali metal hydroxides and carbonates and alkaline earth metal hydroxides such as potassium hydroxide, sodium carbonate, barium hydroxide, calcium hydroxide, and the like may also be used if desired.

As stated, one of the principal advantages of the invention is the fact that it may be conducted in an aqueous media. It is also an advantage that the reaction may be completed in a relatively short period of time, usually within an hour. It is preferable to keep the temperature of the reaction low, usually between —5° and 40° C. in order to avoid hydrolysis of the intermediates. Since the reaction is exothermic in nature it is usually necessary to add ice or otherwise provide cooling means for the reaction.

As noted by the equations given above, the reaction takes place in two stages. It is not necessary to isolate the reaction product from each of the separate reactions before proceeding with the next, however. In fact, for all practical purposes, the reactions may be conducted in a single reaction vessel as one reaction. Preferably two equivalents of the alkali are added to complete the first stage of the reaction. Thereafter an excess of alkali is added to bring about ring closure and formation of a salt of 3-substituted benzotetronic acid. If desired the entire amount of alkali may be added at one time, but because of the liberation of heat in the reaction mixture this is not ordinarily done.

As will be obvious from the equations, a salt of 3-substituted benzotetronic acid is formed in the reaction. The free acid is obtained therefrom by simple neutralization of the salt with an acid. The free benzotetronic acid may then be converted into any desired salt by treatment with a suitable alkali, ammonia, organic amine, or other salt-forming substance, or by methods of double decomposition.

My invention will now be described by means of the following examples in which representative 3-substituted benzotetronic acids are prepared from various intermediates having doubly-activated methylene groups. Parts are by weight unless otherwise indicated.

*Example 1*

A mixture of 24 g. (0.15 mol) of diethyl malonate, 19.8 g. (0.1 mol) of acetylsalicylyl chloride, 50 g. of ice, and 50 cc. of water was made in a 500 cc. flask. To this was added 15 g. of 50% sodium hydroxide and the flask was shaken vigorously. More sodium hydroxide was added as required to keep the reaction mixture at pH 11 or higher and ice was added to keep the temperature between 5° and 10° C. A clear yellowish colored solution with some heavy oily drops resulted.

The water-insoluble material was separated from the clear solution and 30 g. more of 50% sodium hydroxide was added. The temperature of the reaction mixture rose and the sodium salt of 3-carboethoxybenzotetronic acid crystallized from solution. The crystalline slurry was cooled to 20° C., filtered, and washed with a saturated salt solution. The filtered cake was then dissolved in 500 cc. of water at 80° C. and 3-carboethoxybenzotetronic acid was precipitated therefrom by the addition of hydrochloric acid to pH 3. After cooling to 20° C., filtering, washing, and drying, there was obtained 17 g. of crude carboethoxybenzotetronic acid.

*Example 2*

A mixture of 45.2 g. (0.4 mol) of ethylcyanoacetate and 200 g. of ice was treated with 20 cc. of 5 N-sodium hydroxide and 39.6 g. (0.2 mol) of acetyl salicylyl chloride was added. This mixture was vigorously agitated and ice was added as necessary to keep the temperature at 0° to 5° C. Additional 50% sodium hydroxide was added to keep the reaction mixture alkaline to benzoazurine. A yellow solution with some water-insoluble matter resulted.

The water-insoluble material was separated and to the solution there was added 75 g. of 50% sodium hydroxide. The reaction mixture heated up to about 40° C. and crystals of the sodium salt of 3-cyanobenzotetronic acid separated. To the mixture was added 50 g. of sodium chloride and the solution was cooled to 20° C. and the crystals were filtered and washed with saturated salt solution. The filtered cake was then redissolved in 100 cc. of water at 60° to 80° C. and hydrochloric acid was added to obtain a pH of about 3 to 4. The resulting crystalline slurry was cooled to 20° C., filtered, washed with water, and dried to give 3-cyanobenzotetronic acid.

*Example 3*

To a mixture of 19.5 g. (0.15 mol) of ethyl acetoacetate, 50 cc. of water, 50 g. of ice and 10 g. of 50% sodium hydroxide contained in a 500 cc. flask was added 9.9 g. (0.05 mol) of acetylsalicylyl chloride. The mixture was shaken vigorously and the temperature maintained at 5°–10° C. by occasionally dipping the flask in an ice bath. After ten minutes another portion of 10 g. of 50% sodium hydroxide and 9.9 g. of acetylsalicylyl chloride were added and the shaking continued. The mixture gradually set up to a thick crystalline paste. After fifteen minutes this was dissolved by adding 350 cc. of water and heating to 90° C. A water-insoluble oily layer was extracted with isopropyl acetate, 50 g. of sodium chloride was added to the aqueous layer, and the mixture was cooled to 20° C. to crystallize the sodium salt. The sodium salt was removed, redissolved in 400 cc. of boiling water and the product precipitated by adjusting the solution to a pH of 3 with hydrochloric acid. After cooling, filtering, washing and drying, there was obtained 12 g. of crude 3-acetylbenzotetronic acid, melting at 135°–137° C. This represented a 59% yield based on the acetylsalicylyl chloride.

*Example 4*

To a mixture of 52 lbs. (0.4 mol) of ethyl acetoacetate, 70 lbs. of ice and 30 lbs. of 20% sodium hydroxide contained in a 50 gallon steel kettle with efficient stirrer was added 40 lbs. (0.2 mol) of acetylsalicylyl chloride. More 20% sodium hydroxide was added as necessary to keep the solution at a pH 10 to 11, requiring about 100 lbs. Ice was added as necessary during this caustic addition to keep the temperature at 0°–5° C.

After about thirty minutes, there was obtained a light brown, clear solution, with a little insoluble oily material which was drained off. The reaction mixture was diluted with half its volume of water and another portion of 45 lbs. of 50% sodium hydroxide was added. The temperature rose to 35° C. and crystallization of the sodium salt of 3-acetylbenzotetronic acid occurred quickly, giving a stiff paste. There was added 30 lbs. of sodium chloride, and after cooling to 20° C., the slurry was filtered and washed with 50 lbs. of saturated salt solution. The cake was dissolved in 250 lbs. of water at 75° C. and 3-acetylbenzotetronic acid was precipitated with hydrochloric acid to a pH of about 3. After cooling to 40° C., filtering, washing and drying there was obtained 30.2 lbs. of dry, tan crystals of crude 3-acetylbenzotetronic acid, melting at 135° to 137° C. This corresponds to a yield of 73.6% based on the acetylsalicylyl chloride used.

I claim:

1. A method of preparing 3-substituted benzotetronic acid and salts thereof which comprises mixing acetyl salicylyl chloride with a compound having the formula

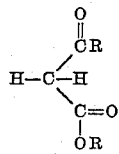

in which R is an alkyl radical in the presence of water and sodium hydroxide at a temperature not in excess of about 40° C.

2. A method of preparing 3-substituted benzotetronic acid and salts thereof which comprises mixing acetyl salicylyl chloride with a compound having the formula

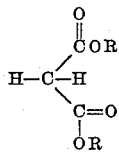

in which R is an alkyl radical in the presence of water and sodium hydroxide at a temperature not in excess of about 40° C.

3. A method of preparing 3-substituted benzotetronic acid and salts thereof which comprises mixing acetyl salicylyl chloride with a compound having the formula

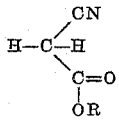

in which R is an alkyl radical in the presence of water and sodium hydroxide at a temperature not in excess of about 40° C.

4. A method of preparing sodium 3-acetyl benzotetronate which comprises mixing acetyl-salicylyl chloride with ethylacetoacetate in the presence of water and sodium hydoxide at a temperature not in excess of about 40° C.

5. A method of preparing sodium carboethoxybenzotetronate which comprises mixing diethyl malonate with acetylsalicylyl chloride in the presence of water and sodium hydroxide at a temperature not in excess of 40° C.

6. A method of preparing sodium 3-cyanobenzotetronate which comprises mixing ethylcyanoacetate with acetylsalicylyl chloride in the presence of water and sodium hydroxide at a temperature not in excess of 40° C.

7. A method of preparing 3-substituted benzotetronic acid and salts thereof which comprises mixing together an acetylsalicylyl halide with a compound having the formula

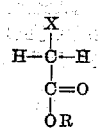

in which X is a radical selected from the group consisting of the radicals

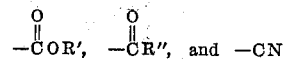

R, R' and R" being alkyl radicals in the presence of water and an alkaline material selected from the group consisting of alkali metal hydroxides, alkali metal carbonates, and alkaline earth metal hydroxides at a temperature not in excess of about 40° C.

8. A method of preparing the sodium salt of 3-substituted benzotetronic acid which comprises mixing acetylsalicylyl chloride with a compound having the formula

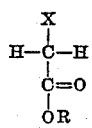

in which X is a radical selected from the group consisting of the radicals

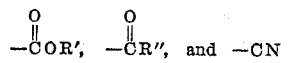

R, R' and R" being alkyl radicals, in the presence of water and sodium hydroxide at a temperature not in excess of about 40° C.

9. A method of preparing 3-substituted benzotetronic acid which comprises mixing acetylsalicylyl chloride with a compound having the formula

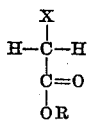

in which X is a radical selected from the group consisting of the radicals

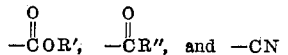

R, and R' and R" being alkyl radicals, in the presence of water and sodium hydroxide at a temperature not in excess of about 40° C. and treating the resulting sodium salt with an acid to form 3-substituted benzotetronic acid.

10. In a method of preparing 3-substituted benzotetronic acids the step which comprises treating in aqueous solution a compound having the formula

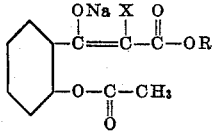

in which X is a radical selected from the group consisting of the radicals

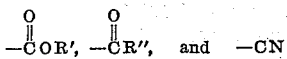

R, R' and R" being alkyl radicals, with sodium hydroxide.

11. A method of preparing sodium carboethoxybenzotetronate which comprises mixing diethyl malonate with acetylsalicylyl halide in the presence of water and sodium hydroxide at a temperature not in excess of about 40° C.

12. The method of preparing 3-substituted benzotetronic acid and salts thereof which comprises mixing acetylsalicylyl halide with a compound having the formula

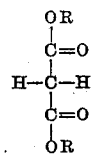

in which R is an alkyl radical, in the presence of water and an alkali metal hydroxide at a temperature not in excess of about 40° C.

MARTIN E. HULTQUIST.

REFERENCES CITED

The following references are of record in the file of this patent:

FOREIGN PATENTS

| Number | Country | Date |
| --- | --- | --- |
| 102,097 | Germany | Jan. 15, 1898 |

OTHER REFERENCES

Stahmann et al., Jr. Amer. Chem. Soc., Dec. 1943, pages 2285 to 2286.

Anschutz, Liebigs Annalen, vol. 367, pages 194 to 196.

Certificate of Correction

Patent No. 2,449,038.  September 7, 1948.

MARTIN E. HULTQUIST

It is hereby certified that errors appear in the printed specification of the above numbered patent requiring correction as follows: Column 2, lines 9 to 13 inclusive, for that portion of the formula reading

column 5, line 72, claim 4, for "hydoxide" read *hydroxide*; and that the said Letters Patent should be read with these corrections therein that the same may conform to the record of the case in the Patent Office.

Signed and sealed this 23rd day of November, A. D. 1948.

[SEAL]

THOMAS F. MURPHY,
*Assistant Commissioner of Patents.*